(12) United States Patent
Fujisawa et al.

(10) Patent No.: US 7,653,253 B2
(45) Date of Patent: Jan. 26, 2010

(54) MOVING IMAGE DECODER

(75) Inventors: Tatsuro Fujisawa, Ome (JP); Yoshihiro Kikuchi, Ome (JP); Yuji Kawashima, Ome (JP); Noriaki Kitada, Tokorozawa (JP); Kosuke Uchida, Ome (JP); Satoshi Hoshina, Ome (JP)

(73) Assignee: Kabushiki Kaisha TOSHIBA, Tokyo (JP)

(*) Notice: Subject to any disclaimer, the term of this patent is extended or adjusted under 35 U.S.C. 154(b) by 849 days.

(21) Appl. No.: 11/385,000

(22) Filed: Mar. 20, 2006

(65) Prior Publication Data
US 2007/0172136 A1 Jul. 26, 2007

(30) Foreign Application Priority Data
Jan. 23, 2006 (JP) ............................. 2006-013770

(51) Int. Cl.
*G06K 9/36* (2006.01)
(52) U.S. Cl. .............. 382/233; 375/240.03; 375/240.25; 375/240.2
(58) Field of Classification Search ................. 382/233; 375/240.03, 240.025, 240.02
See application file for complete search history.

(56) References Cited

U.S. PATENT DOCUMENTS

| 5,694,346 | A * | 12/1997 | Milano et al. ............... 708/402 |
| 6,259,734 | B1 * | 7/2001 | Boon ........................... 375/240 |
| 6,353,683 | B1 * | 3/2002 | Horiike ....................... 382/238 |
| 6,751,357 | B2 * | 6/2004 | Boon ........................... 382/243 |
| 7,035,471 | B2 * | 4/2006 | Kondo et al. ................ 382/233 |
| 2002/0154227 | A1 * | 10/2002 | Lan et al. ................. 348/240.2 |
| 2003/0206582 | A1 * | 11/2003 | Srinivasan et al. ..... 375/240.01 |
| 2004/0125876 | A1 * | 7/2004 | Kodama et al. ........ 375/240.16 |
| 2005/0052294 | A1 * | 3/2005 | Liang et al. .................... 341/63 |
| 2006/0227881 | A1 * | 10/2006 | Gordon ................. 375/240.25 |

FOREIGN PATENT DOCUMENTS

WO WO2004064255 A2 * 7/2004
WO WO2005025226 A1 * 3/2005

OTHER PUBLICATIONS

Dongming Zhang, Shouxun Lin, Yongdong Zhang, Lejun Yu, "Complexity controllable DCT for real-time H.264 encoder", Elsevier, J. Vis. Commun. Image R. 18, 2007, pp. 59-67. <www.elsevier.com/locate/jvci>.*

* cited by examiner

*Primary Examiner*—Brian Q. Le
*Assistant Examiner*—Mekonen Bekele
(74) *Attorney, Agent, or Firm*—Frishauf, Holtz, Goodman & Chick, P.C.

(57) ABSTRACT

When a quantized DCT coefficient and a quantization parameter are input from an entropy decoder, a controller outputs them to a switch and gives a load detector an instruction to detect system load. The load detector requests system load information from OS. If the system load is light, the load detector controls the switch to execute first inverse quantization of general load by a general processor and obtain a DCT coefficient. If the system load is heavy, the load detector controls the switch to execute second inverse quantization whose processing load is lighter than the first inverse quantization by a specific processor and obtain a DCT coefficient.

5 Claims, 4 Drawing Sheets

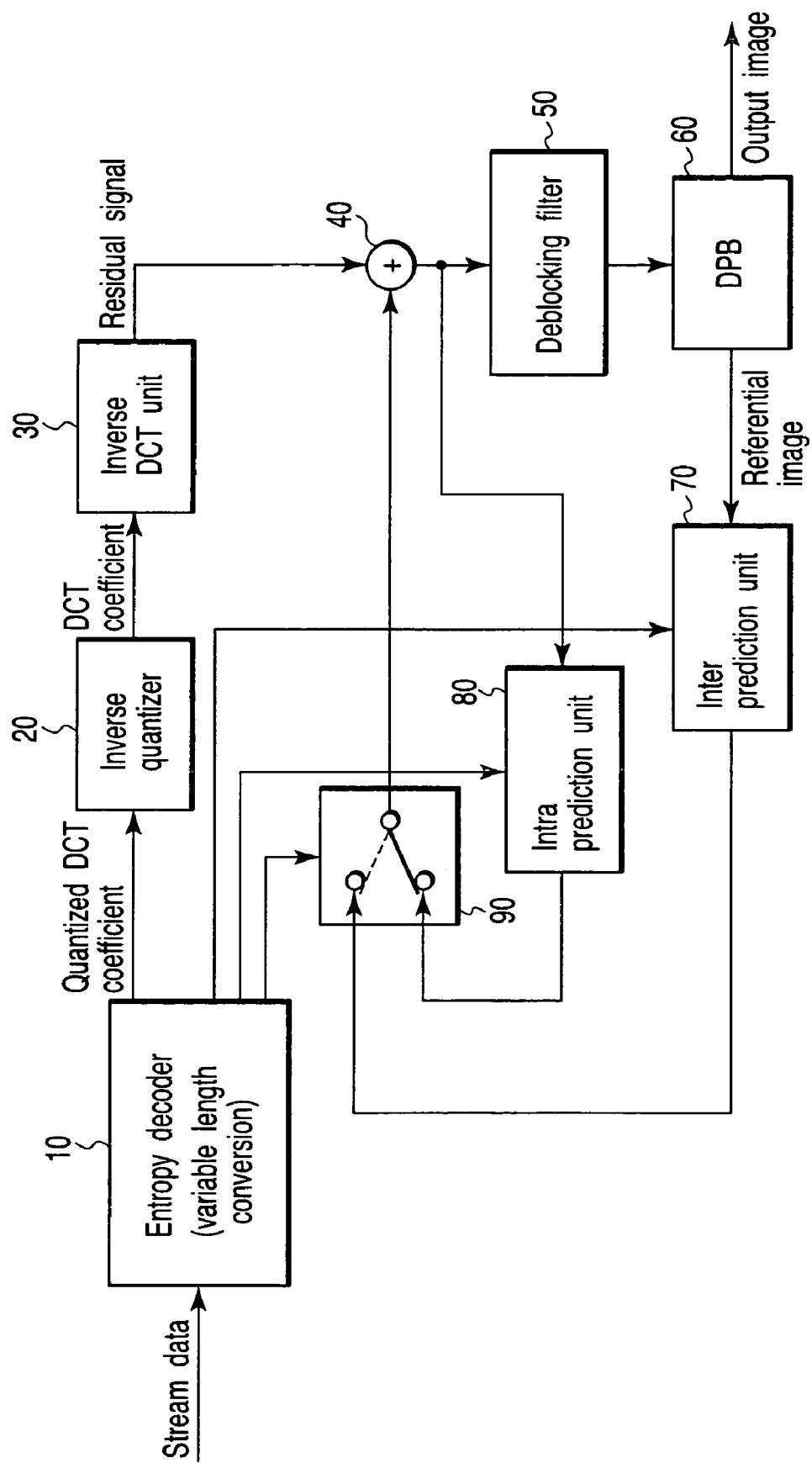
F I G. 1

| QP%6 | α | β | γ |
|---|---|---|---|
| 0 | 10 | 16 | 13 |
| 1 | 11 | 18 | 14 |
| 2 | 13 | 20 | 16 |
| 3 | 14 | 23 | 18 |
| 4 | 16 | 25 | 20 |
| 5 | 18 | 29 | 23 |

| QP/6 | 0 | | | 1 | | | 2 | | | 3 | | | 4 | | | 5 | | | 6 | | | 7 | | | 8 | | |
|---|---|---|---|---|---|---|---|---|---|---|---|---|---|---|---|---|---|---|---|---|---|---|---|---|---|---|---|
| QP%6 | α | β | γ | α | β | γ | α | β | γ | α | β | γ | α | β | γ | α | β | γ | α | β | γ | α | β | γ | α | β | γ |
| 0 | 3 | 4 | 4 | 4 | 5 | 5 | 5 | 6 | 6 | 6 | 7 | 7 | 7 | 8 | 8 | 8 | 9 | 9 | 9 | 10 | 10 | 10 | 11 | 11 | 11 | 12 | 12 |
| 1 | 3 | 4 | 4 | 4 | 5 | 5 | 5 | 6 | 6 | 6 | 7 | 7 | 7 | 8 | 8 | 8 | 9 | 9 | 9 | 10 | 10 | 10 | 11 | 11 | 11 | 12 | 12 |
| 2 | 4 | 4 | 4 | 5 | 5 | 5 | 6 | 6 | 6 | 7 | 7 | 7 | 8 | 8 | 8 | 9 | 9 | 9 | 10 | 10 | 10 | 11 | 11 | 11 | 12 | 12 | 12 |
| 3 | 4 | 4 | 4 | 5 | 5 | 5 | 6 | 6 | 6 | 7 | 7 | 7 | 8 | 8 | 8 | 9 | 9 | 9 | 10 | 10 | 10 | 11 | 11 | 11 | 12 | 12 | 12 |
| 4 | 4 | 5 | 4 | 5 | 6 | 5 | 6 | 7 | 6 | 7 | 8 | 7 | 8 | 9 | 8 | 9 | 10 | 9 | 10 | 11 | 10 | 11 | 12 | 11 | . | . | . |
| 5 | 4 | 5 | 4 | 5 | 6 | 5 | 6 | 7 | 6 | 7 | 8 | 7 | 8 | 9 | 8 | 9 | 10 | 9 | 10 | 11 | 10 | 11 | 12 | 11 | . | . | . |

FIG. 5

MOVING IMAGE DECODER

CROSS-REFERENCE TO RELATED APPLICATIONS

This application is based upon and claims the benefit of priority from prior Japanese Patent Application No. 2006-013770, filed Jan. 23, 2006, the entire contents of which are incorporated herein by reference.

BACKGROUND OF THE INVENTION

1. Field of the Invention

This invention relates to a moving image decoder capable of decoding, for example, moving image data subjected to stream transmission.

2. Description of the Related Art

In a conventional moving image decoder, for example, if processing of a system (cellular telephone, PC, etc.) comprising a H.264/AVC decoder (for example, Draft ITU-T Recommendation and Final Draft International Standard of Joint Video Specification (ITU-T Rec. H.264|ISO/IEC 14496-10 AVC)) becomes under heavy load conditions, continuing decoding as usual becomes difficult, frames are dropped out, object movement is extremely delayed, and inconvenience such as cancellation of decoding, etc. is thereby caused.

BRIEF SUMMARY OF THE INVENTION

The present invention has been accomplished to solve the above-described problems. The object of the present invention is to provide a moving image decoder capable of preventing the frame dropouts and the extreme delay in the object movement even when the processing is under heavy load conditions.

To achieve this object, an aspect of the present invention is a moving image decoder decoding stream data obtained by processing a moving image signal by DCT (discrete cosine transform), quantizing the processed moving image signal and processing the quantized moving image signal by entropy encoding, to regenerate an image. The moving image decoder comprises decoding means for processing the stream data by entropy decoding, and obtaining a quantized DCT coefficient, detecting means for detecting processing load in the moving image decoder, inverse quantizing means for, if the processing load detected by the detecting means is smaller than a preset threshold value, inverse quantizing the DCT coefficient output by the decoding means by first inverse quantization and, if the processing load detected by the detecting means is equal to or greater than the preset threshold value, inverse quantizing the DCT coefficient output by the decoding means by second inverse quantization whose processing load is smaller than the first inverse quantization, and regenerating means for regenerating an image by executing image prediction in accordance with an output of the inverse quantizing means.

Thus, the present invention can provide a moving image decoder capable of preventing the frame dropouts and the extreme delay in the object movement even when the processing is under heavy load conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a moving image decoder according to an embodiment of the present invention;

FIG. 5 is a table to be stored by a specific processor shown in FIG. 2.

DETAILED DESCRIPTION OF THE INVENTION

Figure 2:
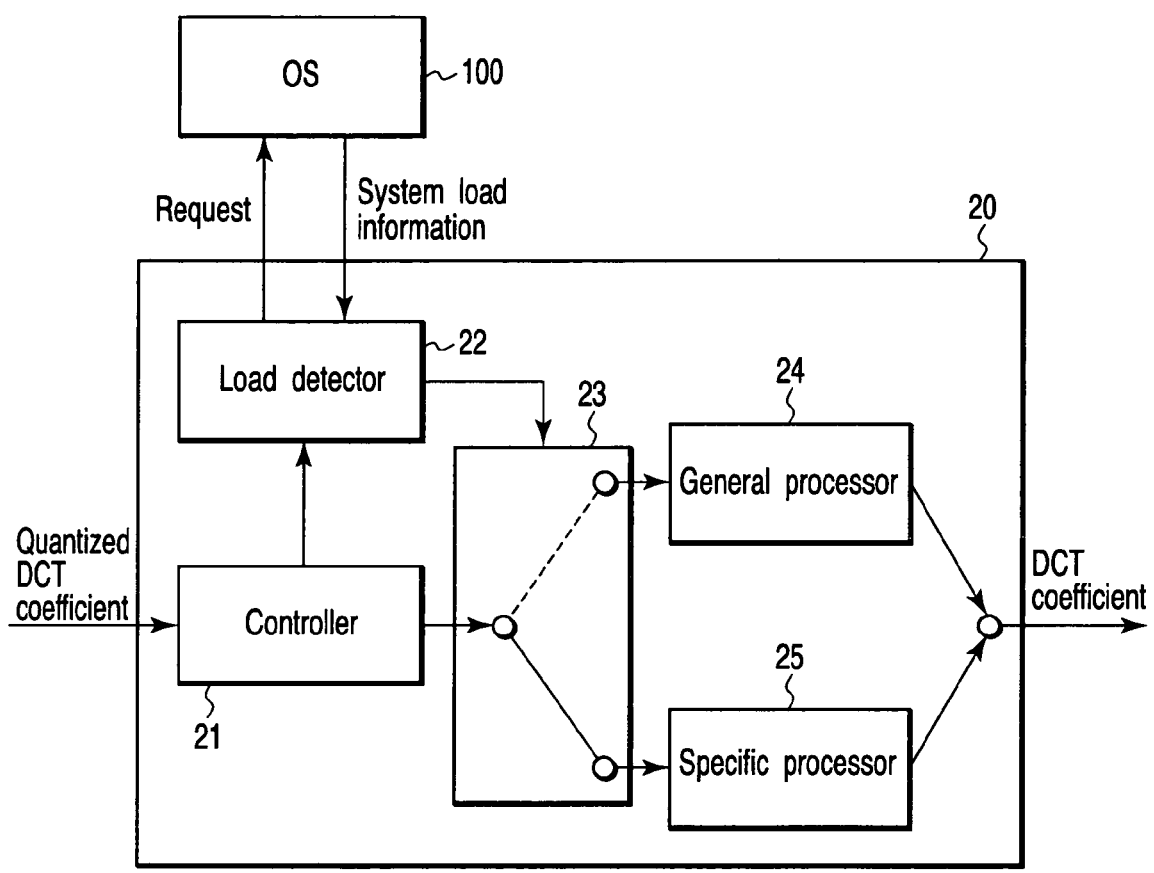
FIG. 2 is a block diagram showing an inverse quantizer in the moving image decoder shown in FIG. 1.

An embodiment of the present invention will be explained below with reference to the accompanying drawings.

FIG. 1 shows a moving image decoder according to an embodiment of the present invention. The moving image decoder comprises an entropy decoder 10, an inverse quantizer 20, an inverse DCT unit 30, an adder 40, a deblocking filter 50, a DPB 60, an inter prediction unit 70, an intra prediction unit 80, and a switch 90. In the following descriptions, H.264/AVC decoder is explained.

The entropy decoder 10 receives stream data (bit string) of compressed images, and processes the data by variable length decoding to obtain a quantized DCT (Discrete Cosine Transform) coefficient (hereinafter called quantized DCT coefficient) and quantization parameter QP. The quantized DCT coefficient and the quantization parameter QP are output to the inverse quantizer 20.

In addition, the entropy decoder 10 discriminates whether the stream data is intra prediction mode data or inter prediction mode data, and controls the switch 90 to be described later in accordance with the discrimination result. The entropy decoder 10 also comprises a function of discriminating whether or not the stream data is data of the image to be used as a reference image.

The inverse quantizer 20 inverse quantizes the quantized DCT coefficient on the basis of the quantization parameter QP, by inverse quantization corresponding to the load on the system in the moving image decoder, to obtain a DCT coefficient. The DCT coefficient is output to the inverse DCT unit 30.

The inverse DCT unit 30 processes the DCT coefficient by the inverse DCT. The processing result is output to the adder 40 as a residual signal.

The adder 40 adds the residual signal and predicted image data which is output from the switch 90. Frame image data is thereby regenerated. The regenerated frame image data is output to the deblocking filter 50 and the intra prediction unit 80.

The deblocking filter 50 subjects the frame image data output from the adder 40 to a processing of improving distortion between encoded blocks and output the processing result to the DPB 60.

The DPB (decoded picture buffer) 60 stores the image data processed by the deblocking filter 50, outputs the stored image by frame unit as an output image and outputs the stored image to inter prediction unit 70 as a reference image.

The inter prediction unit 70 executes inter prediction on the basis of the quantized DCT coefficient obtained by the entropy decoder 10 and the reference image output from the DPB 60, generates predicted image data and outputs the predicted image data to the switch 90.

The intra prediction unit 80 executes intra prediction on the basis of the frame image data output from the adder 40 and the quantized DCT coefficient obtained by the entropy decoder 10, generates predicted image data, and outputs the predicted image data to the switch 90.

The switch 90 selectively outputs to the adder 40 either the predicted image data obtained by the inter prediction unit 70 or the predicted image data obtained by the intra prediction unit 80.

Next, a configuration of the inverse quantizer 20 shown in FIG. 1 will be described with reference to FIG. 2. The inverse quantizer 20 comprises a controller 21, a load detector 22, a switch 23, a general processor 24 and a specific processor 25.

The controller 21 controls all of the units in the inverse quantizer 20. When the quantized DCT coefficient and the quantization parameter QP are input from the entropy decoder 10 to the controller 21, the controller 21 outputs the quantized DCT coefficient and the quantization parameter QP to the switch 23 and gives the load detector 22 an instruction to detect the load on the system.

In response to the instruction of the controller 21, the load detector 22 requests the system load information from OS (operating system) 100 of the moving image decoder. Then, the load detector 22 controls the switch 23, in accordance with the system load information obtained from the OS 100 by the request, to selectively output the quantization parameter QP and the quantized DCT coefficient to the general processor 24 or the specific processor 25.

More specifically, if the system load is lower than a preset threshold value, the load detector 22 urges the switch 23 to output the quantization parameter QP and the quantized DCT coefficient to the general processor 24. If the system load is equal to or greater than a preset threshold value, the load detector 22 urges the switch 23 to output the quantization parameter QP and the quantized DCT coefficient to the specific processor 25. If the system load is heavy, movement of the regenerated image becomes slower or image frames drop out due to the delay in inverse quantization of a subsequent stage. Therefore, the threshold value is preset by considering the balance between the occurrence of these inconveniences and the magnitude of the system load.

The general processor 24 processes the quantized DCT coefficient by general inverse quantization (hereinafter called first inverse quantization) to obtain the DCT coefficient. The specific processor 25 processes the quantization parameter QP and the quantized DCT coefficient by specific inverse quantization (hereinafter called second inverse quantization) that applies lower load to the system than the first inverse quantization to obtain the DCT coefficient. The first inverse quantization and the second inverse quantization are described below.

The first inverse quantization is executed according to formula (1) by pixel unit to obtain the DCT coefficient. In the formula (1), QP represents a quantization parameter and "<<" represents a left shift operation. In addition, "levelscale" is obtained on the basis of a table shown in FIG. 3.

$$(DCT\ \text{Coefficient}) = \{(\text{Quantized}\ DCT\ \text{Coefficient}) \times (\text{levelscale})\} << (QP/6) \quad (1)$$

Figures 3, 4:
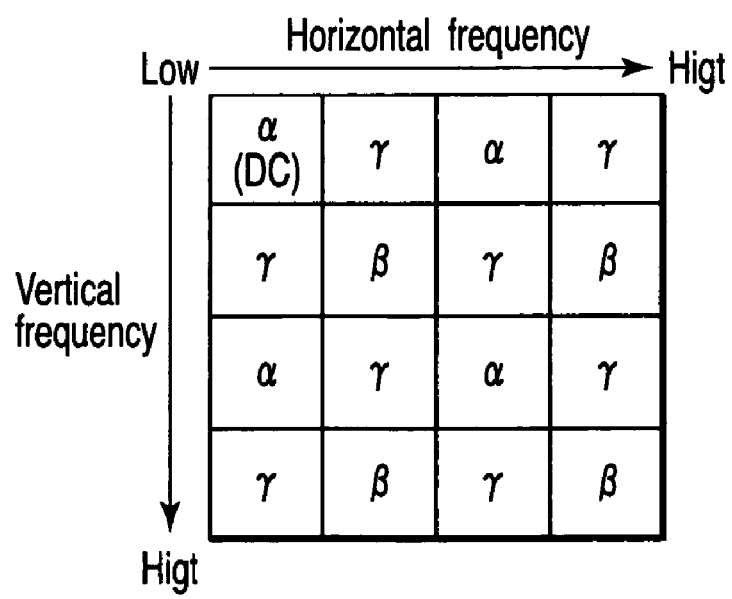
FIG. 3 is a table to be stored by a general processor shown in FIG. 2.
FIG. 4 is a table showing strings of orthogonal exchange components.

In the table of FIG. 3, $\alpha, \beta, \gamma$ represent columns of orthogonal exchange components as represented as a 4×4 pixel block of FIG. 4. The table provides "levelscale" values based on correspondence of these columns to QP % 6, which are stored in the general processor 24.

The second inverse quantization is executed according to formula (2) by pixel unit to obtain the DCT coefficient. The "modified_levelscale" is obtained according to a table shown in FIG. 5. The table of FIG. 5 provides "modified_levelscale" values based on correspondence of QP/6, pixel attributes $\alpha, \beta, \gamma$, and QP % 6, which are stored in the specific processor 25. "%" represents a remainder of division.

$$(DCT\ \text{Coefficient}) = (\text{Quantized}\ DCT\ \text{Coefficient}) << (\text{modified\_levelscale}) \quad (2)$$

The table of FIG. 5 is based on the table of FIG. 3 and, for example, each value of "modified_levelscale" is obtained as explained below.

For example, if the quantization parameter QP is "22", i.e. if QP/6=3 and QP % 6=4, the first inverse quantization provides $\alpha=16, \beta=25, \gamma=20$ in accordance with the table of FIG. 3.

$$(DCT\ \text{Coefficient}) = \left\{ \frac{(\text{Quantized}\ DCT\ \text{Coefficient}) \times}{(levelscale)} \right\} << (22/6)$$

$$= \left\{ \frac{(\text{Quantized}\ DCT\ \text{Coefficient}) \times}{(levelscale)} \right\} << 3$$

$$= \left\{ \frac{(\text{Quantized}\ DCT\ \text{Coefficient}) \times}{(16, 25, 20)} \right\} << 3$$

$\alpha, \beta, \gamma$ are made approximate to the power of two. In other words, $\alpha=16, \beta=32, \gamma=16$. "x2^m" can be replaced with "<<n" and "<<m<<n" can be replaced with "<<(m+n)". Thus, the above formula can be converted into the following formula.

$$(DCT\ \text{Coefficient}) = \left\{ \frac{(\text{Quantized}\ DCT\ \text{Coefficient}) \times}{(16, 32, 16)} \right\} << 3$$

$$= \left\{ \frac{(\text{Quantized}\ DCT\ \text{Coefficient}) <<}{(4, 5, 4)} \right\} << 3$$

$$= (\text{Quantized}\ DCT\ \text{Coefficient}) << (7, 8, 7)$$

In other words, as $\alpha, \beta, \gamma$ are values approximate to the power of two in formula (2), degradation in image quality may be caused. However, as the DCT coefficient can be obtained with the left shift operation alone, the load on the system is lower than the case of formula (1).

Next, operations of the moving image decoder having the above-described configuration are described.

The stream data input to the moving image decoder is subjected to variable length decoding by the entropy decoder 10 to obtain the quantized DCT coefficient and the quantization parameter QP, which are output to the inverse quantizer 20 of FIG. 2.

When the quantized DCT coefficient and the quantization parameter QP are input from the entropy decoder 10, the controller 21 outputs them to the switch 23 and gives the load detector 22 an instruction to detect the load on the system. On the other hand, the load detector 22 requests the system load information from the OS 100.

If the load information obtained from the OS 100 in response to the request indicates "light load" that is smaller than the preset threshold value, the controller 21 controls the switch 23 to output the quantization parameter QP and the quantized DCT coefficient to the general processor 24. The first inverse quantization according to formula (1) is thereby executed in the inverse quantizer 20 to obtain the DCT coefficient.

On the other hand, if the load information obtained from the OS 100 in response to the request indicates "heavy load" that is equal to or greater than the preset threshold value, the controller 21 controls the switch 23 to output the quantization parameter QP and the quantized DCT coefficient to specific processor 25. The second inverse quantization according to formula (2) is thereby executed in the inverse quantizer 20 to obtain the DCT coefficient.

The DCT coefficient thus obtained is subjected to DCT by the inverse DCT unit 30 and the residual signal is thereby obtained. The residual signal is added to the predicted image data output from the switch 90, by the adder 40. The frame image data is thereby regenerated. The regenerated frame image data is output to the deblocking filter 50 and the intra prediction unit 80.

The frame image output from the adder 40 is subjected to the processing to improve the distortion between the encoded blocks, in the deblocking filter 50. The processed image data is temporarily stored in the DPB 60, output by frame unit as the output image, and output to the inter prediction unit 70 as the reference image.

In the inter prediction unit 70, inter prediction is executed on the basis of the quantized DCT coefficient obtained by the entropy decoder 10 and the reference image output from the DPB 60, and the predicted image data is thereby generated. In the intra prediction unit 80, intra prediction is executed on the basis of the frame image data output from the adder 40 and the quantized DCT coefficient obtained by the entropy decoder 10, and the predicted image data is thereby generated.

The switch 90 selectively outputs to the adder 40 either the predicted image data obtained by the inter prediction unit 70 or the predicted image data obtained by the intra prediction unit 80, under control of the entropy decoder 10.

In the moving image decoder, as described above, the first inverse quantization of general processing load is executed to obtain the DCT coefficient when the system load is light while the second inverse quantization of lighter processing load than the first inverse quantization is executed to obtain the DCT coefficient when the system load is heavy.

Therefore, even if the processing load is heavy, frame dropouts and extreme delay in the object movement can be prevented, and inconveniences such as cancellation of decoding can be reduced.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the system load conditions are monitored and the inverse quantization is switched in accordance with the level of the system load, in the above-described embodiment. In addition to this, however, a discriminating unit which presets a threshold value to split the frequency components of the DCT coefficients into low-frequency components and high-frequency components, compares them and discriminates whether the frequency components of the DCT coefficients are low-frequency components or high-frequency components, may be provided in the inverse quantizer 20. The second inverse quantization may be executed in an only case where the system load is equal to or greater than the present value and the discriminating unit discriminates that the frequency component is the high-frequency component.

This is based on the fact that, in general, an error in the DCT coefficient of the low-frequency component is noticeable in the regenerated image. The approximate error which may occur when the second inverse quantization is executed can be restricted to the minimum.

In addition, the second inverse quantization may be executed in an only case where the system load is equal to or greater than the present value and the switch 90 outputs the predicted image data of the inter prediction unit 70.

This is based on the fact that in the inter prediction mode, in general, the quantized DCT coefficient is inclined to be smaller as the remainder becomes smaller. In the inter prediction mode, a small number of the approximate errors occur even if the second inverse quantization is executed.

More specifically, for example, this can be implemented by giving the load detector 22 an instruction to detect the system load in an only case where the controller 21 monitors the switch 90 to output the predicted image data of the inter prediction unit 70.

Moreover, the error in the reference image is accumulated and the degradation influences the image, in the inter prediction mode. Thus, the second inverse quantization may be executed, for an image which is not the reference image, in a case where the system load is equal to or greater than the present threshold value.

More specifically, this can be implemented if the controller 21 gives the load detector 22 an instruction to detect the system load in an only case where the entropy decoder 10 discriminates the stream data as the data which is not the reference image.

Needless to say, the present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving image decoder decoding stream data obtained by processing a moving image signal by DCT (discrete cosine transform), quantizing the processed moving image signal and processing the quantized moving image signal by entropy encoding, to regenerate an image, the moving image decoder comprising:

decoding means for processing the stream data by entropy decoding and obtaining a quantized DCT coefficient;

detecting means for detecting processing load in the moving image decoder;

inverse quantizing means for, if the processing load detected by the detecting means is smaller than a preset threshold value, inverse quantizing the DCT coefficient output by the decoding means by first inverse quantization and, if the processing load detected by the detecting means is equal to or greater than the preset threshold value, inverse quantizing the DCT coefficient output by the decoding means by second inverse quantization in which processing load is smaller than the first inverse quantization; and regenerating means for regenerating an image by executing image prediction in accordance with an output of the inverse quantizing means.

2. The moving image decoder according to claim 1, wherein in the first inverse quantization, the DCT coefficient output by the decoding means is inverse quantized by multiplication of a left shift corresponding to a quantization parameter and a level scale corresponding to the quantization parameter, and in the second inverse quantization, inverse quantization is executed by executing the left shift corresponding to the quantization parameter and a shift based on a value approximate to the level scale corresponding to the quantization parameter, for the DCT coefficient output by the decoding means.

3. The moving image decoder according to claim 1, further comprising component discrimination means for discriminating whether or not the DCT coefficient output by the decoding means is a high-frequency component equal to or higher than the preset threshold value, wherein the inverse quantizing means inverse quantizes the DCT coefficient output by the decoding means by the second inverse quantization in a case where the processing load is equal to or higher than the preset threshold value and where the component discrimination means discriminates the DCT coefficient as the high-frequency component, and inverse quantizes the DCT coefficient output by the decoding means by the first inverse quantization in other cases.

4. The moving image decoder according to claim 1, further comprising mode discrimination means for discriminating whether the stream data is data which has been encoded in an intra prediction mode or data encoded in an inter prediction mode, on the basis of the decoding result of the decoding means, wherein the inverse quantizing means inverse quantizes the DCT coefficient output by the decoding means by the second inverse quantization in a case where the processing load is equal to or higher than the preset threshold value and where the mode discrimination means discriminates the stream data as the data encoded in the inter prediction mode, and inverse quantizes the DCT coefficient output by the decoding means by the first inverse quantization in other cases.

5. The moving image decoder according to claim 1, further comprising image discrimination means for discriminating whether or not the stream data is data to be used as a reference image of inter prediction, on the basis of the decoding result of the decoding means, wherein the inverse quantizing means inverse quantizes the DCT coefficient output by the decoding means by the second inverse quantization in a case where the processing load is equal to or higher than the preset threshold value and where the image discrimination means discriminates the stream data as the reference image, and inverse quantizes the DCT coefficient output by the decoding means by the first inverse quantization in other cases.

\* \* \* \* \*